United States Patent
Ruhlmann et al.

(10) Patent No.: US 8,329,809 B2
(45) Date of Patent: Dec. 11, 2012

(54) USE OF AN ACRYLIC DISPERSING AGENT—ASSOCIATIVE THICKENER PAIR IN AN ALKIDE PAINT FOR IMPROVING THE RETENTION OF ITS GLOSS LEVEL

(75) Inventors: Denis Ruhlmann, Genay (FR); Jean-Marc Suau, Lucenay (FR)

(73) Assignee: Coatex S.A.S., Genay (FR)

( * ) Notice: Subject to any disclaimer, the term of this patent is extended or adjusted under 35 U.S.C. 154(b) by 46 days.

(21) Appl. No.: 12/988,696

(22) PCT Filed: Apr. 29, 2009

(86) PCT No.: PCT/IB2009/005522
§ 371 (c)(1),
(2), (4) Date: Oct. 20, 2010

(87) PCT Pub. No.: WO2009/138840
PCT Pub. Date: Nov. 19, 2009

(65) Prior Publication Data
US 2011/0046280 A1     Feb. 24, 2011

(30) Foreign Application Priority Data
May 14, 2008   (FR) ..................... 08 02601

(51) Int. Cl.
*C08L 33/00* (2006.01)
*C09B 67/00* (2006.01)
(52) U.S. Cl. ........................ 524/522; 524/502
(58) Field of Classification Search ............... 524/522
See application file for complete search history.

(56) References Cited

U.S. PATENT DOCUMENTS
| | | | |
|---|---|---|---|
| 7,772,351 B2 * | 8/2010 | Dupont et al. ............... 528/25 |
| 2004/0147672 A1 | 7/2004 | Ruhlmann et al. |
| 2005/0085563 A1 | 4/2005 | Esselborn et al. |
| 2007/0066752 A1 * | 3/2007 | Ruhlmann et al. ........... 524/589 |

FOREIGN PATENT DOCUMENTS
| | | |
|---|---|---|
| FR | 2 826 014 | 12/2002 |
| WO | 2004 045755 | 6/2004 |

OTHER PUBLICATIONS
International Search Report issued Jul. 27, 2009 in PCT/IB09/005522 filed Apr. 29, 2009.

\* cited by examiner

*Primary Examiner* — Hui Chin
(74) *Attorney, Agent, or Firm* — Oblon, Spivak, McClelland, Maier & Neustadt, L.L.P.

(57) ABSTRACT

The invention consists of the use, in an alkide resin formulation in an aqueous phase, of a dispersing agent/thickener pair:
  the dispersing agent is a copolymer of (meth)acrylic acid with an oxyalkylated monomer possessing a polymerizable function and terminated by hydrogen or an alkyl group having from 1 to 4 carbon atoms,
  the thickener is an associative thickener containing at least one hydrophobic group which is a polystyrylphanyl, preferentially chosen from among distyrylphenyl, tristyrylphenyl, and mixtures thereof, and which is very preferentially tristyrylphenyl.

This combination makes it possible to improve the brightness level retention of the paint film over time, while ensuring that the aqueous formulation has the desired rheology.

28 Claims, No Drawings

USE OF AN ACRYLIC DISPERSING AGENT—ASSOCIATIVE THICKENER PAIR IN AN ALKIDE PAINT FOR IMPROVING THE RETENTION OF ITS GLOSS LEVEL

This application is a 371 of PCT/IB2009/005522 filed Apr. 29, 2009.

Very generally, an aqueous paint is made up of water, a mineral or organic pigment, and a polymer binder ultimately ensuring the cohesion between all of said paint's components. It is well known that the gloss of the final dried paint film results from good pigment dispersiveness: for this reason, the person skilled in the art has developed additives which are known as "dispersing agents" and whose function is to ensure that the pigment is properly dispersed. At the same time, paint also contains additives whose role is to give the medium an appropriate viscosity for its in-can stability, its transportation, the loading of the tool, and its application: These are rheology modifiers or thickeners.

Among these thickeners, the person skilled in the art has for several years known of a particular category of thickeners called "associative", in the sense that they have at least one hydrophobic monomer that may develop so-called associative interactions and thereby thicken the medium into which they are added. These structures have been heavily described in the literature, particularly by J. E. Glass et al.; e.g. (I) J. Oil, Color Chemists Assn. (1984), 67(10), 256; (II) ibid (1984), 67 (11), 279; (III) ibid (1986), 69(10), 263; (IV) ibid (1988), 71(10), 315; (V) Prog. Org. Coatings (1989), 17, 155-173.).

Still viewed from a very general angle, it is well known that the dispersing agents and thickeners (particularly associative ones) may develop complex interactions within the paint (see document WO 93 09187), just as said associative thickeners may interact with surface active agents, if any (see document EP 0 905 1571), which may lead to a degradation in said paint's properties, particularly including its rheology and its gloss.

This existing condition poses the general and conventional problem of choosing a dispersing agent-(associative) thickener system for the person skilled in the art, who wishes to both increase the gloss of his paint, while adjusting its rheology. This problem is exacerbated in the very particular case of aqueous paints covered within the present Application, and also through the very specific properties covered by the technical problem in that same Application.

Among the various categories of water-based paints, there is one which holds currently very particular importance: "alkide (alkyd) paints". This term refers either to polyesters resulting from the reaction of organic acids with polyols, or to so-called alkide-urethanes resulting from the condensation of polyols with isocyanate functions. Historically, alkide paints were manufactured in the presence of organic solvents, which constituted most of the phase within which the alkide resin was dispersed. Today, international legislation relating to volatile organic compound waste (Sbornik Prispevku—Mezinarodni Konference—Naterovich Homtach—37$^{th}$—Czech Republic, 22-24 May 2006, 92-104) requires a person skilled in the art to shift attention to alkide water-based paints.

To do so, surface active agents are used whose function is to disperse said alkide resin in the presence of water; organic solvents are also used, but to a lesser extent than before, also to facilitate the dispersion of the resin within the aqueous phase. These are therefore complex systems, in which the presence not only of surface active agents but also organic solvents constitutes an initial obstacle to identifying an optimal dispersing agent/associated thickener pair.

Additionally, within the context of these water-based alkide systems, if obtaining a high level of gloss is a major requirement, maintaining this level as the film ages is also a need for the person skilled in the art to fulfill. Even more restrictively, maintaining the film's level of brightness, depending on when the paint is applied, is what constitutes the major requirement for the person skilled in the art. This restriction reflects the reality of implementing a paint on an industrial scale. The paint is formulated, though without being intended to be applied immediately: however, whether the paint is applied immediately, or after several weeks of storage, the resulting dry film must exhibit the same level of gloss. This behavior is designated using the term "gloss level retention".

Finally, the water-based alkide paint thereby formulated must take into account the rheological behavior desired by the person skilled in the art. This behavior is reflected by a Brookfield™ this coffee value, measured at 10 revolutions per minute at 25° C., of between 4,000 mPa.s and 10,000 mPa.s. This interval corresponds to a compromise that makes it possible to avoid phase separation, supernatant, or syneresis phenomena (at too low a viscosity), while ensuring that the application pool is properly loaded, and that the film spreads or holds properly (the properties would be worsened if the viscosity is too high).

Thus, the technical problem covered by the present Application amounts to searching for a dispersing agent/thickener pair, for complex systems using surface active agents and organic solvents, in particular water-based alkide formulations, in order to improve the property of gloss level retention. Obtaining a high gloss level immediately after application, and maintaining that level for the dry paint film as it ages and as the paint itself ages, also forms part of the technical problem of the present invention. Offering a water-based alkide formulation whose Brookfield™ viscosity, measured at 10 revolutions per minute and 25° C., is between 4,000 mPa.s and 10,000 mPa.s, constitutes the latter portion of said technical problem.

Seeking to resolve this problem, the Applicant has developed the use within a water-based alkide resin formulation, as an agent proving the gloss level retention of the dry film resulting from applying said formulation, of a dispersing agent/thickener pair, characterized in that:

the dispersing agent is a copolymer of (meth)acrylic acid with an oxyalkylated monomer possessing a polymerizable function and terminated by hydrogen or an alkyl group having from 1 to 4 carbon atoms, the thickener is an associative thickener containing at least one hydrophobic group which is a polystyrylphanyl, preferentially chosen from among distyrylphenyl, tristyrylphenyl, and mixtures thereof, and which is very preferentially tristyrylphenyl.

Entirely surprisingly, the combination of this dispersing agent and this thickener which leads to an improvement in the gloss level retention for the paint's dry film, while imparting the desired rheology to the paint formulation (no phase separation, no supernatant, no syneresis, tool well-loaded, good spreading and satisfactory holding in application).

As a reminder, the following structures (1) and (2) respectively designate distyrylphenyl and tristyrylphenyl:

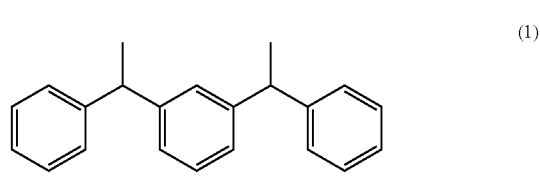

(1)

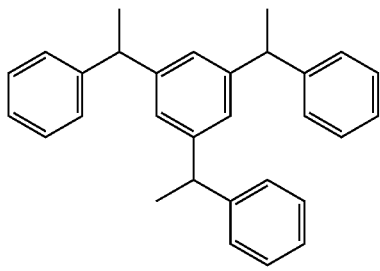

Such structures are already known to the person skilled in the art as being implemented for associative thickeners, in documents EP 1 425,325 for improving pigment compatibility, EP 0 705 852 and EP 0 705 854 for manufacturing rheology modifiers which are effective in low doses, EP 1 806 386 for maintaining good viscosity in the presence of a large quantity of pigments (which had already been disclosed in document EP 1 425 325).

Furthermore, nothing in the literature discloses that associative thickeners, implementing the aforementioned groups, and in association with dispersing agents which are (meth) acrylic copolymers with an oxyalkylated monomer, form agents improving the gloss level retention. One of the Applicant's merits is having been able to identify, from among the multitude of dispersing agents and associative thickeners available, those whose combination led to an improvement in the rheology and gloss level retention according to the intended specifications. This merit is all the greater given that the formulations in question are water-based alkide paints, containing surface active agents and organic solvents, whose harmful interactions which they may develop with the associative thickeners are known.

Thus, a first object of the invention is the use, in a formulation of alkide resin in an aqueous phase, as an agent improving the gloss level retention of the dry film resulting from applying said formulation, of a dispersing agent/thickener pair, characterized in that:
- the dispersing agent is a copolymer of (meth)acrylic acid with an oxyalkylated monomer possessing a polymerizable function and terminated by hydrogen or an alkyl group having from 1 to 4 carbon atoms,
- the thickener is an associative thickener containing at least one hydrophobic group which is a polystyrylphanyl, preferentially chosen from among distyrylphenyl, tristyrylphenyl, and mixtures thereof, and which is very preferentially tristyrylphenyl.

This use is further characterized in that said dispersing agent is a copolymer of acrylic acid with an oxyalkylated monomer possessing a polymerizable function and terminated by hydrogen or an alkyl group having from 1 to 4 carbon atoms.

This use is further characterized in that for said dispersing agent, the oxyalklyated monomer possesses 5 to 150, preferentially 10 to 115 count ethylene and/or propylene oxide.

This use is further characterized in that for said dispersing agent, the oxyalklyated monomer is terminated by hydrogen or the methyl group.

This use is further characterized in that for said dispersing agent, the oxyalkylated monomer's polymerizable function is the methacrylate function.

This use is further characterized in that said dispersing agent exhibits a molecular weight between 15,000 g/mol and 110,000 g/mol, preferentially between 20,000 g/mol and 60,000 g/mol.

This use is further characterized in that the associated thickener containing at least one hydrophobic group which is distyrylphenyl, tristyrylphenyl or a mixture of distyrylphenyl and tristyrylphenyl, has the formula (I):

$$R-OX_1-V-(OX_2-W)_a-OX_3-R,$$ where:

V and W designate a urethane bond,
a designates a real number between 1 and 5,
$OX_1$, $OX_2$ and $OX_3$ designate ethylene-based and/or propylene-based oxyalkylated groups,
R designates a hydrophobic group which is a polystyrylphenyl, preferentially chosen from among distyrylphenyl, tristyrylphenyl and mixtures thereof, and which is very preferentially tristyrylphenyl.

This use is further characterized in that, for the associative thickener, the number of ethylene and/or propylene oxide units in groups $OX_1$ and $OX_3$ is between 2 and 100.

This use is further characterized in that, for the associative thickener, the number of ethylene and/or propylene oxide units for group $OX_2$ is between 100 and 500.

This use is further characterized in that, for the associative thickener, R designates a hydrophobic group which is tristyrylphenyl.

This use is further characterized in that the associative thickener exhibits a molecular weight between 5,000 g/mol and 80,000 g/mol, preferentially between 5,000 g/mol and 40,000 g/mol.

This use is further characterized in that the alkide resin is chosen from among polyester resins, polyurethanes, polyurethane-polyesters and mixtures thereof.

This use is further characterized in that the alkide resin formulation in an aqueous phase exhibits a Brookfield™ viscosity, measured at 25° C. and at 10 revolutions/minute, of between 4,000 and 10,000 mPa.s.

This use is further characterized in that the alkide resin formulation in an aqueous phase is a paint, a lacquer, a varnish or a woodstain.

Another object of the invention consists of an alkide resin formulation in an aqueousphase, containing, as an agent improving the gloss level retention of the dry film resulting from the application of said formulation, a dispersing agent/thickener pair, characterized in that:
- the dispersing agent is a copolymer of (meth)acrylic acid with an oxyalkylated monomer possessing a polymerizable function and terminated by hydrogen or an alkyl group having from 1 to 4 carbon atoms,
- the thickener is an associative thickener containing at least one hydrophobic group which is a polystyrylphanyl, preferentially chosen from among distyrylphenyl, tristyrylphenyl, and mixtures thereof, and which is very preferentially tristyrylphenyl.

This alkide resin formulation in an aqueous phase containing a dispersing agent/thickener pair is further characterized in that said dispersing agent is a copolymer of acrylic acid with an oxylakylated monomer possessing a polymerizable function and terminated by hydrogen or an alkyl group having 1 to 4 carbon atoms.

This alkide resin formulation in an aqueous phase containing a dispersing agent/thickener pair is further characterized in that for said dispersing agent, the oxylakylated monomer possesses 5 to 150, preferentially 10 to 115 count of ethylene and/or propylene oxide units.

This alkide resin formulation in an aqueous phase containing a dispersing agent/thickener pair is further characterized in that for said dispersing agent, the oxylakylated monomer is terminated by hydrogen or the methyl group.

This alkide resin formulation in an aqueous phase containing a dispersing agent/thickener pair is further characterized in that for said dispersing agent, the oxylakylated monomer's polymerizable function is the methacrylate function.

This alkide resin formulation in an aqueous phase containing a dispersing agent/thickener pair is further characterized in that said dispersing agent exhibits a molecular weight between 15,000 g/mol and 110,000 g/mol, preferentially between 20,000 g/mol and 60,000 g/mol.

This alkide resin formulation in an aqueous phase containing a dispersing agent/thickener pair is further characterized in that said thickener exhibits the formula (I):

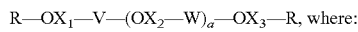

R—$OX_1$—V—($OX_2$—W)$_a$—$OX_3$—R, where:

V and W designate a urethane bond,
a designates a real number between 1 and 5,
$OX_1$, $OX_2$ and $OX_3$ designate ethylene-based and/or propylene-based oxyalkylated groups,
R designates a hydrophobic group which is a polystyrylphenyl, preferentially chosen from among distyrylphenyl, tristyrylphenyl and mixtures thereof, and which is very preferentially tristyrylphenyl.

This alkide resin formulation in an aqueous phase containing a dispersing agent/thickener pair is further characterized in that, for the associative thickener, the number of ethylene and/or propylene oxide units in the groups $OX_1$ and $OX_3$ is between 2 and 100.

This alkide resin formulation in an aqueous phase is further characterized in that, for the associative thickener, the number of ethylene and/or propylene oxide units for the group $OX_2$ is between 100 and 500.

This alkide resin formulation in an aqueous phase is further characterized in that, for the associative thickener, R designates a hydrophobic group which is tristyrylphenyl.

This alkide resin formulation in an aqueous phase is further characterized in that the associative thickener exhibits a molecular weight between 5,000 g/mol and 80,000 g/mol, preferentially between 5,000 g/mol and 40,000 g/mol.

This alkide resin formulation in an aqueous phase is further characterized in that the alkide resin is chosen from among polyester resins, polyurethanes, polyurethanes-polyester and mixtures thereof.

This alkide resin formulation in an aqueous phase is further characterized in that it exhibits a Brookfield™ viscosity, measured at 25° C. and 10 revolutions/minute, between 4,000 and 10,000 mPa.s.

This alkide resin formulation in an aqueous phase is further characterized in that it is a paint, a lacquer, a varnish or a woodstain.

EXAMPLES

Each of the following tests began by creating a paint by mixing, based on the knowledge of the person skilled in the art, different components in proportions as given in table 1.

TABLE 1

| Components | Function (Producer) | Quantity (g) |
|---|---|---|
| Water | — | 54.4 |
| Acticide MBS | Bactericide (THOR ™) | 2 |
| Tego Foamex 815 N | Antifoaming agent (TEGO CHEMIE ™) | 2 |
| AMP 90 | Neutralizing agent (ANGUS ™) | 0.5 |
| Tiona 595 | Titanium dioxide (MILLENIUM ™) | 265 |
| Synaqua 2080 | Binder (CRAY VALLEY ™) | 630 |
| Durham Cobalt 10WM | Drier (ELEMENTIS ™) | 3.1 |

For each of the paints corresponding to tests #1 to 19, a certain dispersing agent/associative thickener system has been used.

Test No. 1

This test illustrates a dispersing agent/thickening agent pair not covered by the invention, and uses:
8 grams of acrylic dispersing agent D1, which is a homopolymer of acrylic acid whose molecular weight is about 11,000 g/mol, fully neutralized by sodium hydroxide,
30 grams of an associative thickener whose molecular weight is about 11,000 g/mol and whose formula is (I), where:
V and W designate a urethane bond,
$OX_1$ and $OX_3$ designate a group made up of 8 ethylene oxide units,
a is equal to 1.1,
$OX_2$ designates a group made up of 225 ethylene oxide units,
R designates the branched hydrophobic alkyl group having 8 carbon atoms.

Test No. 2

This test illustrates a dispersing agent/thickening agent pair not covered by the invention, and uses:
8 grams of an acrylic dispersing agent denoted D1,
30 grams of an associative thickener whose molecular weight is about 24,300 g/mol and whose formula is (I), where:
V and W designate a urethane bond,
$OX_1$ and $OX_3$ designate a group made up of 25 ethylene oxide units,
a is equal to 2.1,
$OX_2$ designates a group made up of 225 ethylene oxide units,
R designates the tristyrylphenyl group.

Test No. 3

This test illustrates a dispersing agent/thickening agent pair not covered by the invention, and uses:
8 grams of an acrylic dispersing agent denoted D2, which is a copolymer of acrylic acid and butyl acrylate (mass ratio 70:30) whose molecular weight is about 9,500 g/mol and which is fully neutralized by potassium hydroxide,
30 grams of an associative thickener whose molecular weight is about 11,000 g/mol and whose formula is (I), where:
V and W designate a urethane bond,
$OX_1$ and $OX_3$ designate a group made up of 8 ethylene oxide units,
a is equal to 1.1,
$OX_2$ designates a group made up of 225 ethylene oxide units,
R designates the branched hydrophobic alkyl group having 8 carbon atoms.

Test No. 4

This test illustrates a dispersing agent/thickening agent pair not covered by the invention, and uses:
8 grams of an acrylic dispersing agent denoted D2,
30 grams of an associative thickener whose molecular weight is about 24,300 g/mol and whose formula is (I), where:
V and W designate a urethane bond,
$OX_1$ and $OX_3$ designate a group made up of 25 ethylene oxide units,
a is equal to 2.1,
$OX_2$ designates a group made up of 225 ethylene oxide units,
R designates the tristyrylphenyl group.

Test No. 5

This test illustrates a dispersing agent/thickening agent pair not covered by the invention, and uses:
- 8 grams of an acrylic dispersing agent denoted D3, whose molecular weight is about 38,500 g/mol and which is made up of, expressed as a % by weight:
  - 13.75% acrylic acid,
  - 4.75% grams of methacrylic acid,
  - 81.5% methoxypolyethylene glycol methacrylate by weight, with a molecular weight equal to 2,000 g/mole,
- 30 grams of an associative thickener sold by the company AQUALON™ under the name Aquaflow™ NHS-300.

Test No. 6

This test illustrates a dispersing agent/thickening agent pair not covered by the invention, and uses:
- 8 grams of an acrylic dispersing agent denoted D3,
- 30 grams of an associative thickener sold by the company AQUALON™ under the name Aquaflow™ NHS-300 and 3 grams of an associative thickener sold by the company AQUALON™ under the name Aquaflow™ NLS-205.

Test No. 7

This test illustrates a dispersing agent/thickening agent pair not covered by the invention, and uses:
- 8 grams of the acrylic dispersing agent denoted D3,
- 30 grams of an associative thickener as used in test #1.

Test No. 8

This test illustrates a dispersing agent/thickening agent pair not covered by the invention, and uses:
- 8 grams of the acrylic dispersing agent denoted D3,
- 30 grams of an associative thickener whose molecular weight is about 12,000 g/mol and whose formula is (1), where:
  - V and W designate a urethane bond,
  - $OX_1$ and $OX_3$ designate a group made up of 25 ethylene oxide units,
  - a is equal to 2.1,
  - $OX_2$ designates a group made up of 225 ethylene oxide units,
  - R designates the branched hydrophobic alkyl group having 12 carbon atoms.

Test No. 9

This test illustrates a dispersing agent/thickening agent pair not covered by the invention, and uses:
- 8 grams of the acrylic dispersing agent denoted D3,
- 30 grams of an associative thickener whose molecular weight is about 11,500 g/mol and whose formula is (I), where:
  - V and W designate a urethane bond,
  - $OX_1$ and $OX_3$ designate a group made up of 6 ethylene oxide units,
  - a is equal to 1.1,
  - $OX_2$ designates a group made up of 225 ethylene oxide units,
  - R designates a mixture of hydrophobic alkyl groups having 8 to 16 carbon atoms.

Test No. 10

This test illustrates a dispersing agent/thickening agent pair not covered by the invention, and uses:
- 8 grams of the acrylic dispersing agent denoted D3,
- 30 grams of an associative thickener whose molecular weight is about 24,000 g/mol and whose formula is (I), where:
  - V and W designate a urethane bond,
  - $OX_1$ and $OX_3$ designate a group made up of 25 ethylene oxide units,
  - a is equal to 2.1,
  - $OX_2$ designates a group made up of 225 ethylene oxide units,
  - R designates the branched hydrophobic alkyl group having 20 carbon atoms.

Test No. 11

This test illustrates a dispersing agent/thickening agent pair not covered by the invention, and uses:
- 8 grams of the acrylic dispersing agent denoted D3,
- 30 grams of an associative thickener whose molecular weight is about 23,000 g/mol and whose formula is (1), where:
  - V and W designate a urethane bond,
  - $OX_1$ and $OX_3$ designate a group made up of 25 ethylene oxide units,
  - a is equal to 2.1,
  - $OX_2$ designates a group made up of 225 ethylene oxide units,
  - R designates the branched hydrophobic alkyl group having 22 carbon atoms.

Test No. 12

This test illustrates a dispersing agent/thickening agent pair not covered by the invention, and uses:
- 8 grams of the acrylic dispersing agent denoted D3,
- 30 grams of an associative thickener whose molecular weight is about 24,000 g/mol and whose formula is (I), where:
  - V and W designate a urethane bond,
  - $OX_1$ and $OX_3$ designate a group made up of 25 ethylene oxide units,
  - a is equal to 2.1,
  - $OX_2$ designates a group made up of 225 ethylene oxide units,
  - R designates the branched hydrophobic alkyl group having 28 carbon atoms.

Test No. 13

This test illustrates the invention, and implements:
- 8 grams of the acrylic dispersing agent denoted D3,
- 30 grams of an associative thickener as described in test #2.

Test No. 14

This test illustrates a dispersing agent/thickening agent pair not covered by the invention, and uses:
- 8 grams of an acrylic dispersing agent D4 whose molecular weight is about 28,000 g/mol and which is made up of, expressed as a % in grams:
  - 13.88% acrylic acid,
  - 1.70% methacrylic acid,
  - 84.42% methoxypolyethylene glycol methacrylate, with a molecular weight equal to 2,000 g/mol,
- 30 grams of an associative thickener sold by the company AQUALON™ under the name Aquaflow™ NHS-300 and 3 grams of an associative thickener sold by the company AQUALON™ under the name Aquaflow™ NLS-205.

Test No. 15

This test illustrates a dispersing agent/thickening agent pair not covered by the invention, and uses:
- 8 grams of the acrylic dispersing agent denoted D4,
- 30 grams of an associative thickener as used in test #8.

Test No. 16

This test illustrates a dispersing agent/thickening agent pair not covered by the invention, and uses:
- 8 grams of the acrylic dispersing agent denoted D4,
- 30 grams of an associative thickener as used in test #12.

Test No. 17

This test illustrates a dispersing agent/thickener pair according to the invention, and uses:
- 8 grams of the acrylic dispersing agent denoted D4,
- 30 grams of an associative thickener whose molecular weight is about 26,000 g/mol and whose formula is (I), where:
  - V and W designate a urethane bond,
  - $OX_1$ and $OX_3$ designate a group made up of 60 ethylene oxide units,
  - a is equal to 2.2,
  - $OX_2$ designates a group made up of 225 ethylene oxide units,
  - R designates the tristyrylphenyl group.

Test No. 18

This test illustrates a dispersing agent/thickener pair according to the invention, and uses:
- 8 grams of the acrylic dispersing agent denoted D4,
- 60 grams of an associative thickener whose molecular weight is about 26,000 g/mol and whose formula is (I), where:
  - V and W designate a urethane bond,
  - $OX_1$ and $OX_3$ designate a group made up of 60 ethylene oxide units,
  - a is equal to 2.2,
  - $OX_2$ designates a group made up of 225 ethylene oxide units,
  - R designates the tristyrylphenyl group.

Test No. 19

This test illustrates a dispersing agent/thickener pair according to the invention, and uses:
- 8 grams of the acrylic dispersing agent denoted D4,
- 70 grams of an associative thickener whose molecular weight is about 26,000 g/mol and whose formula is (I), where:
  - V and W designate a urethane bond,
  - $OX_1$ and $OX_3$ designate a group made up of 60 ethylene oxide units,
  - a is equal to 2.2,
  - $OX_2$ designates a group made up of 225 ethylene oxide units,
  - R designates the tristyrylphenyl group.

For each of the tests #1 to #19, the Brookfield™ viscosities were measured, at 10 revolutions per minute and 25° C., at 24 hours, 10 days, 1 month, and 3 months after formulating the paint (see table 1).

The gloss was also determined at 20° (with a Micro-Tri-Gloss™ reflectometer sold by the company BYK GARD-NER™ according to the NF T 30-064 standard), 1 day, 1 month, and 3 months after applying the paint, this paint having been applied 1 week, 1 month, or 3 months after having been formulated (see table 2 on the following page).

TABLE 1

| Test | Disp. PA/IN | agent | Thickener R | OX1 | Viscosity (mPa·s) 24H | 10 D | 1 M |
|---|---|---|---|---|---|---|---|
| 1 | PA | D1 | C8 | 8 EO | 15200 | 16000 | 16200 |
| 2 | PA | D1 | TSP | 25 EO | 11200 | 11800 | 12100 |
| 3 | PA | D2 | branched C8 | 8 EO | 15200 | 15800 | 16200 |
| 4 | PA | D2 | TSP | 25 EO | 10200 | 11000 | 11200 |
| 5 | PA | D3 | Aquaflow NHS 300 | | 1900 | 1700 | 1400 |
| 6 | PA | D3 | Aquaflow NHS 300 Aquaflow NLS 205 | | 2700 | 2500 | 2100 |
| 7 | PA | D3 | C8 | 8 EO | 10400 | 11700 | 11600 |
| 8 | PA | D3 | C12 | 25 EO | 32000 | 31500 | 32500 |
| 9 | PA | D3 | C8-C16 | 6 EO | 34200 | 34300 | 33900 |

TABLE 1-continued

| Test | Disp. PA/IN | agent | Thickener R | OX1 | Viscosity (mPa·s) 24H | 10 D | 1 M |
|---|---|---|---|---|---|---|---|
| 10 | PA | D3 | C20 | 25 EO | 51400 | 52000 | 52500 |
| 11 | PA | D3 | C22 | 25 EO | 55500 | 56000 | 57200 |
| 12 | PA | D3 | C28 | 25 EO | — | — | — |
| 13 | IN | D3 | TSP | 25 EO | 9000 | 9700 | 9300 |
| 14 | PA | D4 | Aquaflow NHS 300 Aquaflow NLS 205 | | 2200 | 1900 | 1500 |
| 15 | PA | D4 | C12 | 25 EO | 32500 | 33500 | 32400 |
| 16 | PA | D4 | C28 | 25 EO | — | — | — |
| 17 | IN | D4 | TSP | 60 EO | 7000 | 6200 | 5500 |
| 18 | IN | D4 | TSP | 60 EO | 7100 | 6300 | 5600 |
| 19 | IN | D4 | TSP | 60 EO | 7200 | 6400 | 5600 |

The table clearly demonstrates that only the pairs corresponding to tests #13 and #17 to #19 lead to a Brookfield™ viscosity, measured at 25° C. and at 10 revolutions/minute, of between 4,000 and 10,000 mPa.s, which is indeed the goal sought by the person skilled in the art. Furthermore, viscosity values could not be determined from tests #12 and #16, given how thick the formulations were.

TABLE 2

| | | Brightness 20° | | | | | | | |
|---|---|---|---|---|---|---|---|---|---|
| | | after 1 D | | | after 1 M | | | after 3 M | | |
| Test | PA/IN | m 1 D | m 1 M | m 3 M | m 1 D | m 1 M | m 3 M | m 1 D | m 1 M | m 3 M |
| 1 | PA | 83 | 80 | 76 | 82 | 75 | 73 | 80 | 74 | 72 |
| 2 | PA | 83 | 82 | 80 | 82 | 80 | 78 | 81 | 78 | 76 |
| 3 | PA | 82 | 79 | 76 | 82 | 75 | 73 | 80 | 74 | 72 |
| 4 | PA | 83 | 82 | 80 | 82 | 80 | 78 | 81 | 79 | 77 |
| 5 | PA | 83 | 81 | 76 | 82 | 75 | 74 | 80 | 74 | 73 |
| 6 | PA | 83 | 80 | 76 | 81 | 74 | 76 | 80 | 74 | 75 |
| 7 | PA | 75 | 68 | 58 | 73 | 60 | 56 | 71 | 59 | 51 |
| 8 | PA | 82 | 77 | 75 | 81 | 77 | 74 | 80 | 76 | 73 |
| 9 | PA | 85 | 79 | 78 | 84 | 79 | 77 | 82 | 77 | 75 |
| 10 | PA | 85 | 78 | 78 | 84 | 78 | 77 | 82 | 76 | 75 |
| 11 | PA | 85 | 78 | 77 | 84 | 78 | 77 | 82 | 77 | 75 |
| 12 | PA | — | — | — | — | — | — | — | — | — |
| 13 | IN | 86 | 84 | 80 | 86 | 84 | 80 | 86 | 84 | 80 |
| 14 | PA | 83 | 79 | 77 | 81 | 78 | 75 | 80 | 75 | 74 |
| 15 | PA | 82 | 78 | 75 | 81 | 77 | 73 | 80 | 76 | 73 |
| 16 | PA | — | — | — | — | — | — | — | — | — |
| 17 | IN | 88 | 84 | 82 | 90 | 85 | 82 | 88 | 85 | 82 |
| 18 | IN | 88 | 84 | 82 | 90 | 85 | 82 | 90 | 85 | 83 |
| 19 | IN | 88 | 83 | 84 | 88 | 84 | 84 | 88 | 84 | 84 |

"ap 1 D" means that the paint was applied 1 day after having been formulated.
"m 1 D" means that the measurement was taken 1 day after applying the paint.

It should be noted that only the tests corresponding to the invention make it possible to maintain the gloss level of the paint film, regardless of when the paint was applied, meaning particularly after 3 months' storage time.

The invention claimed is:

1. A method of improving the three month gloss level retention of a dry film obtained from applying an alkide resin formulation in an aqueous phase to a surface,
said method comprising mixing a dispersing agent and a thickener with water or an aqueous solution or an alkide resin precursor to give the alkide resin formulation in the aqueous phase,
wherein:
the dispersing agent is a copolymer of (meth)acrylic acid with an oxyalkylated monomer comprising a polymerizable function and terminated by hydrogen or an alkyl group having from 1 to 4 carbon atoms; and the thickener is an associative thickener comprising at least one hydrophobic group selected from the group consisting of a distyrylphenyl, a tristyrylphenyl, a tetrastyrylphenyl, and pentastyrylphenyl.

2. The method according to claim 1, wherein the dispersing agent is a copolymer of acrylic acid with an oxyalkylated monomer comprising a polymerizable function and terminated by hydrogen or an alkyl group having from 1 to 4 carbon atoms.

3. The method according to claim 1 wherein, in the dispersing agent, the oxyalkylated monomer comprises 5 to 150 ethylene and/or propylene oxide units.

4. The method according to claim 1 wherein, in the dispersing agent, the oxyalkylated monomer is terminated by hydrogen or a methyl group.

5. The method according to claim 1 wherein, in the dispersing agent, the polymerizable function of the oxyalkylated monomer is a methacrylate function.

6. The method according to claim 1 wherein the dispersing agent has a molecular weight between 15,000 g/mol and 110,000 g/mol.

7. The method according to claim 1 wherein the associative thickener has formula (I):

$$R-OX_1-V-(OX_2-W)_a-OX_3-R \qquad (I)$$

wherein
V and W designate a urethane bond,
a designates a real number between 1 and 5,
$OX_1$, $OX_2$ and $OX_3$ designate ethylene-based and/or propylene-based oxyalkylated groups, and
R designates at least one hydrophobic group selected from the group consisting of a distyrylphenyl, a tristyrylphenyl, a tetrastyrylphenyl, and pentastyrylphenyl.

8. The method according to claim 7, wherein, in the associative thickener, a number of ethylene and/or propylene oxide units in groups $OX_1$ and $OX_3$ is between 2 and 100.

9. The method according to claim 7, wherein, in the associative thickener, a number of ethylene and/or propylene oxide units for the group $OX_2$ is between 100 and 500.

10. The method according to claim 7, wherein, in the associative thickener, R designates tristyrylphenyl.

11. The method according to claim 1, wherein the associative thickener has a molecular weight between 5,000 g/mol and 80,000 g/mol.

12. The method according to claim 1, wherein the alkide resin is at least one selected from the group consisting of a polyester resin, a polyurethane, and a polyurethane-polyester.

13. The method according to claim 1 wherein the alkide resin formulation in an aqueous phase exhibits a Brookfield™ viscosity, measured at 25° C. and at 10 revolutions/minute, of between 4,000 and 10,000 mPa.s.

14. The method according to claim 1, wherein the alkide resin formulation in an aqueous phase is a paint, a lacquer, a varnish, or a woodstain.

15. An alkide resin formulation in an aqueous phase, comprising a dispersing agent and a thickener, wherein:
the dispersing agent is a copolymer of (meth)acrylic acid with an oxyalkylated monomer comprising a polymerizable function and terminated by hydrogen or an alkyl group having from 1 to 4 carbon atoms; and
the thickener is an associative thickener comprising at least one hydrophobic group selected from the group consisting of a distyrylphenyl, a tristyrylphenyl, a tetrastyrylphenyl, and pentastyrylphenyl.

16. The alkide resin formulation according to claim 15, wherein the dispersing agent is a copolymer of acrylic acid with an oxyalkylated monomer comprising a polymerizable function and terminated by hydrogen or an alkyl group having 1 to 4 carbon atoms.

17. The alkide resin formulation according to claim 15 wherein, in the dispersing agent, the oxyalkylated monomer comprises 5 to 150 ethylene and/or propylene oxide units.

18. The alkide resin formulation according to claim 15, wherein, in the dispersing agent, the oxyalkylated monomer is terminated by hydrogen or a methyl group.

19. The alkide resin formulation according to claim 15, wherein, in the dispersing agent, the polymerizable function of the oxyalkylated monomer is a methacrylate function.

20. The alkide resin formulation according to claim 15, wherein the dispersing agent has a molecular weight between 15,000 g/mol and 110,000 g/mol.

21. The alkide resin formulation according to claim 15, wherein the thickener has the formula (I):

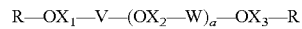
$$R-OX_1-V-(OX_2-W)_a-OX_3-R \qquad (I),$$

wherein
V and W designate a urethane bond,
a designates a real number between 1 and 5,
$OX_1$, $OX_2$, and $OX_3$ designate ethylene-based and/or propylene-based oxyalkylated groups,
R designates at least one hydrophobic group selected from the group consisting of a distyrylphenyl, a tristyrylphenyl, a tetrastyrylphenyl, and pentastyrylphenyl.

22. The alkide resin formulation according to claim 21, wherein, in the associative thickener, the number of ethylene and/or propylene oxide units in the groups $OX_1$ and $OX_3$ is between 2 and 100.

23. The alkide resin formulation according to claim 21, wherein, in the associative thickener, the number of ethylene and/or propylene oxide units in the group $OX_2$ is between 100 and 500.

24. The alkide resin formulation according to claim 21, wherein, in the associative thickener, R is tristyrylphenyl.

25. The alkide resin formulation according to claim 15, wherein the associative thickener has a molecular weight between 15,000 g/mol and 110,000 g/mol.

26. The alkide resin formulation according to claim 15, wherein an alkide resin of the alkide resin formulation is at least one selected from the group consisting of polyester resins, polyurethanes, and polyurethane-polyesters.

27. The alkide resin formulation according to claim 15 having a Brookfield™ viscosity, measured at 25° C. and 10 revolutions/minute, between 4,000 and 10,000 mPa.s.

28. The alkide resin formulation according to claim 15, in the form of a paint, a lacquer, a varnish, or a woodstain.

* * * * *